July 16, 1968 W. T. VAN LIERDE 3,392,494
GRINDING DEVICES
Filed Dec. 1, 1965
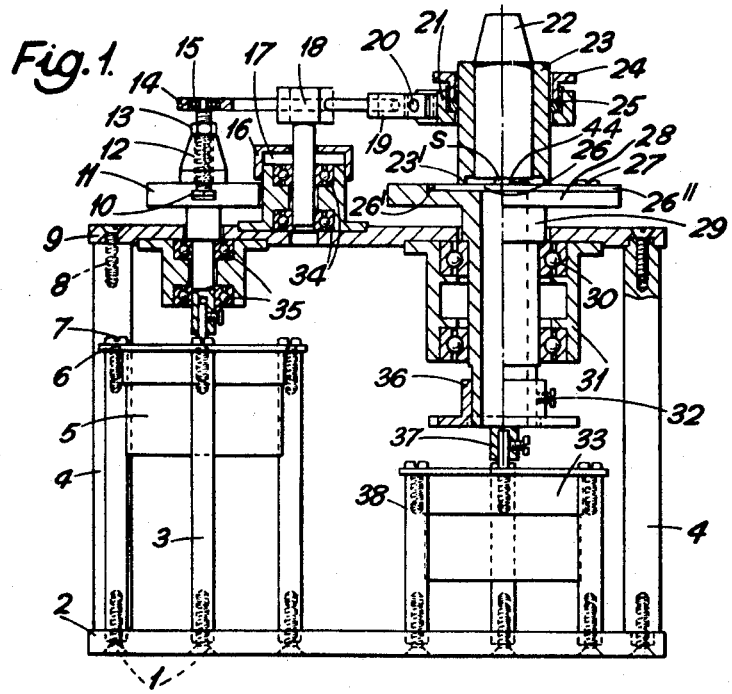
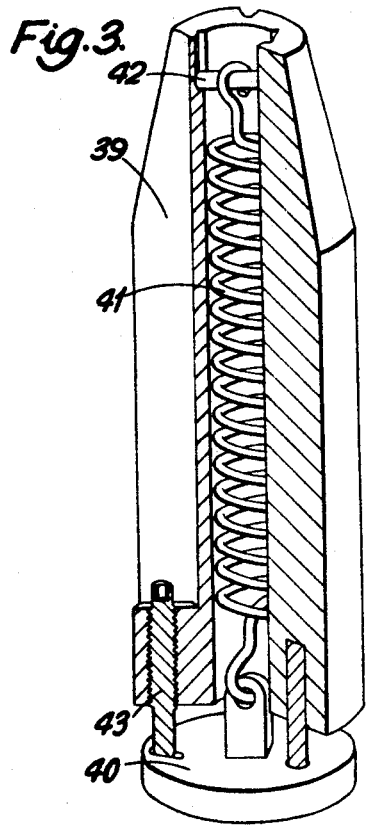
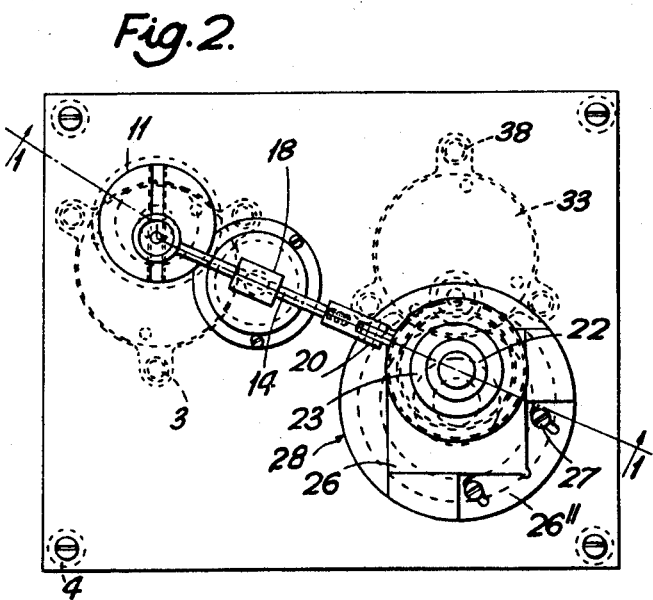
INVENTOR
WALTER T. VAN LIERDE
BY
Roland C. Anderson
ATTORNEY United States Patent Office 3,392,494
Patented July 16, 1968

3,392,494
GRINDING DEVICES
Walter T. Van Lierde, Mechelen, Belgium, assignor, by mesne assignments, to the United States Atomic Energy Commission
Filed Dec. 1, 1965, Ser. No. 511,289
Claims priority, application Great Britain, Dec. 1, 1964, 48,799/64
10 Claims. (Cl. 51—121)

ABSTRACT OF THE DISCLOSURE

A machine for grinding and polishing workpieces in order to obtain flat surfaces and to cut away parallel layers wherein a workpiece holder oscillates perpendicular to a reference surface on a rotatable grinding table in a prescribed path. The workpiece surface is adjustable within the holder by a workpiece holding plate which is supported against three uniformly spaced pins, at least one of which is adjustable.

---

This invention relates to precision grinding machines. It provides a machine capable of grinding and polishing small samples in order to produce a nearly optically flat surface and of cutting away parallel layers of about a tenth of a micron.

Such a grinding machine finds utility in providing suitable samples for analysis or irradiation measurements, particularly self-diffusion measurements as, for example, measurement of the uranium-ion self-diffusion in uranium dioxide, and also in polishing of very difficult compacts, such as carbides and graphite compacts, or samples consisting of materials with very different harnesses.

The precision grinding machine provided by the invention is based on a novel principle and affords considerable advantages over usual grinding devices to be found in the trade for mechanical preparation of metallographic samples.

It enables one to treat sample surfaces with a very high degree of precision not yet reached by the usual devices:

(a) In obtaining optical surfaces not only free from scratches, but also free from protuberances and undulations bigger than 0.1 micron over all the surface, (b) In cutting away thing layers 0.1 to 0.08 micron thick, perfectly parallel with the surface of origin, (c) In carrying out both these operations avoiding surface deformations even when the hardness and the resistance to abrasion are not homogeneous over the surface to be treated.

Grinding machines are known in which the sample or workpiece to be ground is mounted in a holder so as to face a layer of grinding material on a fixed support or on a rotating disc and is obliged to perform a determined path over the grinding surface.

Whereas in devices having a fixed support the sample can contact only a limited area of the grinding surface, in devices with rotating disc a greater area or substantially all the grinding surface can be reached by the sample by rotation of the sample holder around an axis parallel to the axis of the disc or by a radial periodic displacement of the holder which is rotating on its own axis.

The main disadvantage inherent in the known grinding and polishing devices is that the movement imparted to the sample is such that, the more external points of the sample surface have a greater displacement than the more internal points, that is not all the points of the surface to be treated cover the same distance over the grinding material, which leads to the impossibility of obtaining a reproducible surface flatness having the above-mentioned degree of precision and of cutting away parallel layers. In the preparation of samples, more particularly samples for analysis or irradiation measurement, or in polishing of compacts materials, there appears in fact a growing protuberance in the sample and a growing depression in correspondence with its softer parts (what is known in metallographic art as "over-polishing") and the sample surface is thus formed with undesired deformations.

Another disadvantage is that the rotating disc moves at a high speed, what leads by the very energetic impact of the grinding or abrasive particles, to the edges and softer parts of the sample being selectively removed, and consequently to the impossibility of conserving a surface of reference.

Furthermore, when in addition to to the rapid rotation of the disc, alternating motions are imparted to the sample, slight deformations caused by the relative speeds and periodical accelerations, are formed on the sample surface.

To all the above-mentioned deformations are to be added those deriving from constructional inaccuracies of the mechanical system supporting the sample holder.

The invention provides a grinding machine comprising a rotatable grinding table for supporting grinding means, means for effecting rotation of the table, a movable workpiece holder for holding a workpiece in contact with grinding means supported on said table, a reference surface on said table, on which a supporting surface of said holder may slide external to the grinding means, means for attachment of the holder to one end of a rod or bar with freedom of movement of the holder in a direction perpendicular to the reference surface, the other end of said bar being connected to a rotatable crank-mechanism and supported for pivotal sliding movement at a position intermediate in its length, whereby the holder is guided to move the workpiece to follow a small endless path or trajectory which does not include the centre of the rotating table and is at least in part eccentric thereto.

The holder movement and the workpiece path may be substantially elliptical.

The workpiece holder may comprise a cylinder body provided at its lower end with a supporting surface formed by an annular rim and a workpiece supporting piston freely slidable in said cylinder.

With the construction of the machine just defined the following results are reached:

(a) During a complete passage around the path, those parts of the workpiece which move on the outside during the first half of the path or trajectory are on the inside during the second half whereby every part of the workpiece surface covers substantially the same distance over the grinding material.

(b) The workpiece performs a polishing path or trajectory opposite to a small grinding surface, which is used to the greatest extent by way of the form of the path or trajectory itself and its positioning in correspondence with the centre of the turnable table.

(c) The sample holder is made self-adjustable on the turnable table, whereby the workpiece surface to be treated automatically places itself parallel to the polishing surface, without being influenced by lateral pressure caused by relative motion of the holder and of the rotating polishing surface itself;

(d) The workpiece is pressed on the grinding means only by the weight of holder-piston, and is submitted to a slow motion opposite to the small grinding surface, itself slowly moving, whereby the sample treatment is effected with a minimum energy, at very little relative speed, performing small movements under small pressure.

A specific embodiment of a machine according to the invention will now be described, by way of example, with reference to the accompanying drawings, in which:

FIGURE 1 is a section of the machine taken mainly on the line 1—1 in FIGURE 2, but showing some additional part;

FIGURE 2 is a plan view of the machine; and

FIGURE 3 is a section showing a particular embodiment of a part of a workpiece or sample holder.

The machine comprises a base plate 2 (in this example about 25 cm. x 20 cm.) with ten upstanding pillars fixed thereon by screws 1. Four of these pillars, 4, support a mounting plate 9 secured by screws 8 while the others, 3 and 38, in groups of three, support two motors 5 and 33. The two motors are mounted on the respective pillars in similar manner. Thus the motor 5 hangs from the pillars 3 to which it is attached by the top plate 6 fixed by screws 7. The motor 33 (driven at 10 r.p.m.) drives at a very slow speed a rotatable grinding table 28, 29 through reduction gearing 32, 36, 37, (in this example the speed of the table being 2.5 r.p.m.). The table 28 is integral with this shaft 29 which is rotatably supported on the mounting base 9 by bearings 30 in a housing 31. A crank 10, 11, 12 and 13 having an adjustable throw is driven at a slow speed (at 200 r.p.m.) by motor 5 and is rotatably supported on the mounting plate 9 by the bearings 35. The crank consists of a rotatable disc 11 with a diametrical T-slot in which a crank-pin 10 is slidable. The pin is steadied by a hollow cone 12 and clamped by nut 13. The upper end of the crank-pin works in a bearing 15 in one end of a connecting rod 14. The other end of the connecting rod is attached to a sample holder 21, 22, 23, 24, 25. The rod is slidable, lengthwise, in a bush 18 which is pivotally supported on the mounting plate 9 by two bearings 34. The pivot of the bush 18 is situated at a distance from the centre of the disc 11 chosen to obtain a particular path of the sample S on the table 28, as hereinafter explained. As one can see from FIGURE 2, the centre of the disc 11, pivot of the bush 18 and centre of the table 28, are on a line and spaced apart, (in this example at 5 cm. and 10 cm., beginning with the disc). As can be derived from FIGURE 2, this line makes a slope of 30° with the front side of the machine.

The sample holder is pivotally attached to the end of the rod 14 at 20 with freedom for up and down movement of the holder. The attachment means include a fork 19 screwed onto the end of rod 14.

The turnable table 28 carries an interchangeable piece of plate glass 26 (6 cm. x 6 cm.) lodged in a depression 26' of its thickness. A cover member 26" so shaped as to maintain in position the glass is fixed to the disc by screw means 27.

The plate glass 26 forms, as hereinafter explained, a reference surface for the sample or workpiece holder movement.

The table 28 is centrally holed and the shaft 29 is hollow to permit observation, by optical means not shown on the figures, of the sample surface through the plate glass 26.

The sample holder comprises essentially a cylinder 23 in which smoothly slides a massive piston 22 to the bottom of which the sample S can be fixed with appropriate adhesive. The cylinder 23 (in this example inside 25 mm., outside 40 mm. and 50 mm. high) is mounted in a clamp 21 pivotally coupled at 20 to the fork 19, and is fixed to this clamp by means of a clamp ring 25 and a sleeve 24. At its lower end the cylinder 23 is reduced in its thickness to form an external rim 23' the lower surface of which is constructed to form a smooth supporting surface for the holder sliding on the glass plate 26 and to be exactly perpendicular to the axis of both cylinder 23 and piston 22. The glass plate 26 constitutes both the reference surface for the movement of the holder, which by means of the pivot 20 can automatically adjust itself quite perpendicular to the glass plate 26 during its movement, and grinding means 44, which covers in a central position on the table 28, a restricted area (in this example 1.5 sq. cm.) which is surrounded by the rim 23' with sufficient clearance that, taking into account the movements of the rim 23', the rim is at all times outside the grinding means. In other terms, the internal diameter of the rim is greater than the diameter of the grinding area by an amount at least equal to the greatest dimension of the trajectory of the workpiece.

In use, the table 28 is rotated to rotate the grinding area, and the crank is rotated to give the sample or workpiece S bodily movement in a closed small path substantially elliptical in form which is confined over the grinding material and does not include the centre of table 28 to permit the sample to use the largest part of this grinding means by rotation of these latter and to give also the cylinder 23 an analogous movement which maintains the rim 23' resting on the glass plate 26 externally to the grinding area. The movement imparted to the holder and to the workpiece or sample S by the crank-mechanism and the rod 14 is such that during a complete passage around the path, those parts of the workpiece which move on the outside during the first half of the path are on the inside during the second half whereby every part of the workpiece surface covers substantially the same distance over the grinding material.

The path covered by the sample S on the grinding means passes at least in part over the central hole of the table 28 to permit observation of the sample surface during functioning of the machine.

The path may encompass the axis of the table or be wholly to one side thereof.

FIGURE 3 shows a sample holder piston for use in preparing samples suitable for diffusion work, which preparations require an intermediate annealing, after which the diffusion sample is to be very accurately remounted parallel to the grinding plane. The piston consists of a cylinder 39 for sliding in holder 23 and equivalent to part 22 of the embodiment of FIGURE 2. At the bottom of the cylinder 39 there is a sample holding plate 40 which is held against three pins 43 by a loaded spring 41 (in the example loaded to a tension of about 5 kg.) anchored by bar 42. Two of the pins 43 are screws which can be adjusted to tilt the plate 40 in relation to the axis of the cylinder.

I claim:

1. A grinding machine comprising a grinding means, a rotatable grinding table for supporting grinding means, means for effecting rotation of the table, a movable workpiece holder for holding a workpiece in contact with grinding means supported on said table, a reference surface on said table on which a supporting surface of said holder may slide external to the grinding means, a rod, means of attachment of the holder to one end of the rod with freedom of movement of the holder in a direction perpendicular to the reference surface, a rotatable crank-mechanism, the other end of said rod being connected to a rotatable crank-mechanism, and said rod supported for pivotal sliding movement at a position intermediate in its length, whereby the holder is guided to move the workpiece to follow a small endless path which does not include the centre of the rotating table and is at least in part eccentric thereto.

2. A machine as claimed in claim 1 in which the workpiece holder comprises a cylinder body provided at its lower end with a supporting surface formed by an annular rim and a workpiece supporting piston freely slidable in said cylinder.

3. A machine as claimed in claim 2 wherein the workpiece supporting piston has substantial mass to provide grinding pressure.

4. A machine as claimed in claim 2 wherein the workpiece supporting piston comrises a cylinder provided at its lower end with three uniformly spaced pins, at least one of which is screw adjustable, a workpiece holding plate in tilted engagement with said pins, and a loaded spring anchored at the top end of the cylinder and attached to said plate for holding it against said pins.

5. A machine as in claim 1 wherein the rotating table has a depression in its thickness forming with a moveable cover member a housing for a member providing the reference surface.

6. A machine as in claim 5 wherein the reference surface is provided by a glass plate.

7. A machine as in claim 1 wherein the rotating table is centrally holed and is supported by a hollow shaft.

8. A machine as in claim 1 wherein the attachment means for the workpiece holder comprises a clamp pivotally fixed to the connecting rod.

9. A machine as in claim 1 wherein the crank mechanism comprises an adjustable throw crank.

10. A machine as in claim 1 wherein the holder movement and the workpiece path are substantially elliptical.

References Cited

UNITED STATES PATENTS

| | | | |
|---|---|---|---|
| 1,420,751 | 6/1922 | Ricketts | 51—124 X |
| 2,398,628 | 4/1946 | Dykoski et al. | 51—124 |
| 2,634,558 | 4/1953 | Wolfskill | 51—131 |
| 2,842,906 | 7/1958 | Carter et al. | 51—131 X |
| 3,224,148 | 12/1965 | Mitchell | 51—124 X |

LESTER M. SWINGLE, *Primary Examiner.*